(12) United States Patent
Buhrke et al.

(10) Patent No.: US 6,925,082 B2
(45) Date of Patent: Aug. 2, 2005

(54) ATM PACKET ACCESS GATEWAY

(75) Inventors: Rolfe Erwin Buhrke, Westchester, IL (US); Edward Alan Clark, Sugar Grove, IL (US); Ronald Harding Davis, Naperville, IL (US); Robert Brian Dianda, Naperville, IL (US); Shang-Fon Su, Naperville, IL (US); Margaret Hueying Yang, Naperville, IL (US); Hsien-Chuen Yu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 767 days.

(21) Appl. No.: 09/784,498

(22) Filed: Feb. 15, 2001

(65) Prior Publication Data

US 2004/0213244 A1 Oct. 28, 2004

(51) Int. Cl.$^7$ ............................................. H04L 12/56
(52) U.S. Cl. ................ 370/393; 370/395.1; 370/395.2; 370/395.3; 370/395.51; 370/395.52
(58) Field of Search .............................. 370/393, 395.1, 370/395.2, 395.3, 395.51, 395.52, 399, 352, 216, 356, 395, 353, 354

(56) References Cited

U.S. PATENT DOCUMENTS

| | | | | |
|---|---|---|---|---|
| 5,483,527 A | * | 1/1996 | Doshi et al. ................ 370/399 |
| 5,568,475 A | * | 10/1996 | Doshi et al. ................ 370/399 |
| 6,026,091 A | | 2/2000 | Christie et al. ............. 370/395 |
| 6,226,260 B1 | * | 5/2001 | McDysan .................... 370/216 |
| 6,243,383 B1 | * | 6/2001 | Li et al. ...................... 370/395 |
| 6,535,507 B1 | * | 3/2003 | Li et al. ...................... 370/356 |
| 6,614,781 B1 | * | 9/2003 | Elliott et al. ................ 370/352 |
| 6,724,747 B1 | * | 4/2004 | Arango et al. .............. 370/352 |
| 6,741,585 B1 | * | 5/2004 | Munoz et al. ............... 370/352 |

FOREIGN PATENT DOCUMENTS

WO    WO 99/40741    8/1999    ............ H04Q/7/22

* cited by examiner

Primary Examiner—Alpus Hsu
Assistant Examiner—Lee Khuong

(57) ABSTRACT

An ATM Packet Access Gateway (ATM PAG) system manages an ATM bearer path extending between ATM endpoints participating, for example, in a VoATM call. The system includes an ATM PAG having a first ATM bearer connection termination for terminating a first bearer connection with a first ATM endpoint, and a second ATM connection termination for terminating a second bearer connection with a second ATM endpoint. A call control entity is associated with the ATM PAG and communicates call control instructions thereto. The call control instructions include instructions for logically concatenating the first and second ATM bearer connections into an active ATM bearer path extending between the first ATM endpoint and the second ATM endpoint. A Media Access Gateway (MAG) function of the ATM PAG is responsible for establishing the connections that form the ATM bearer path. An ATM switch function of the ATM PAG moves bearer traffic ATM packet payloads over the active ATM bearer path.

31 Claims, 7 Drawing Sheets

ATM PACKET ACCESS GATEWAY

CROSS REFERENCE TO RELATED APPLICATIONS

The present application is related to commonly assigned copending application Ser. No. 09/784,497, entitled IP Packet Access Gateway, filed on even date with the present application.

BACKGROUND OF THE INVENTION

1. Field of the Invention

This invention relates to telecommunication networks. More particularly, the invention concerns the control of voice calls in an ATM network.

2. Description of the Prior Art

By way of background, ATM (Asynchronous Transfer Mode) packet networks are now being used to provide bearer pathways for voice communications. In these systems, voice calls between communicating parties are placed on through-connections established by ATM network switching nodes. Such connections are generally under the control of the parties' subscriber equipment, whose call state (on-hook or off-hook) determines connection status (setup, release, etc.).

What is lacking in conventional VoATM (Voice over ATM) systems is an interface for implementing bearer path connection control and manipulation at network points of entry or within the network. In particular, there is no mechanism for positive enforcement of bearer connection establishment and teardown. Connections cannot be terminated except by one or both of the communicating parties. This means that the parties might continue to talk even though billing for a call has stopped (i.e., because the bearer path remains open). Conversely, billing might continue after the parties have ended the call.

Conventional VoATM systems also lack ability to provide pivot points for VoATM lines and trunks carrying ATM bearer traffic into and out of an ATM backbone network. Such pivot points are currently only provided by LAGs (Line Access Gateways) and TAGs (Trunk Access Gateways) that interwork between TDM bearer traffic and packet-oriented (e.g., ATM, IP) bearer traffic. Without a pivot point on the trunk side of an ATM entry point of a switching node, the switching node needs to be aware of when another switching node in a call manipulates the bearer path. The bearer path thereby becomes a shared resource that all switching nodes jointly use to provide their own services. This greatly increases the complexity of implementing services because feature interactions cross switch boundaries. Without a pivot point on the line side of an ATM network entry point, the switching node cannot perform call redirection and insert/remove service circuits in established connections to provide the usual features available to traditional TDM (Time Division Multiplexing) calls. Such services include N-way bridging, announcement playback, tone generation, tone detection, speech recognition, and multicasting.

In addition to the foregoing disadvantages of conventional VoATM systems, certain law enforcement statutes, such as the Communications Assistance for Law Enforcement Act (CALEA) (47 U.S.C. 1001 et seq.), require that a call involving a surveillance subject remain under surveillance even after the subject is no longer a participant in the call. Because court orders for CALEA surveillance may limit the geographic scope over which the surveillance may be performed, there is a need to ensure that the bearer path for a call stays within the geographic bounds within which it may be surveilled. If calling parties are able to establish a bearer path using conventional ATM connections, there is no such guarantee.

Accordingly, there is a need in an ATM network providing VoATM service for an interface system that implements bearer path connection control and manipulation at ATM points of entry of a switching node. The same capability is also needed when data and video calls are transported over ATM.

SUMMARY OF THE INVENTION

The foregoing problems are solved and an advance in the art is obtained by an ATM Packet Access Gateway (ATM PAG) system for managing an ATM bearer path extending between ATM endpoints participating in an ATM call. The system includes an ATM PAG having a first ATM connection termination for terminating a first bearer connection with a first ATM endpoint, and a second ATM connection termination for terminating a second bearer connection with a second ATM endpoint. A call control entity is associated with the ATM PAG and communicates call control instructions thereto. The call control instructions include instructions for logically concatenating the first and second ATM bearer connections into an active ATM bearer path extending between the first ATM endpoint and the second ATM endpoint. A Media Access Gateway (MAG) function of the ATM PAG is responsible for establishing the connections that form the ATM bearer path. An ATM switch function of the ATM PAG moves bearer traffic ATM packet payloads over the active ATM bearer path.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
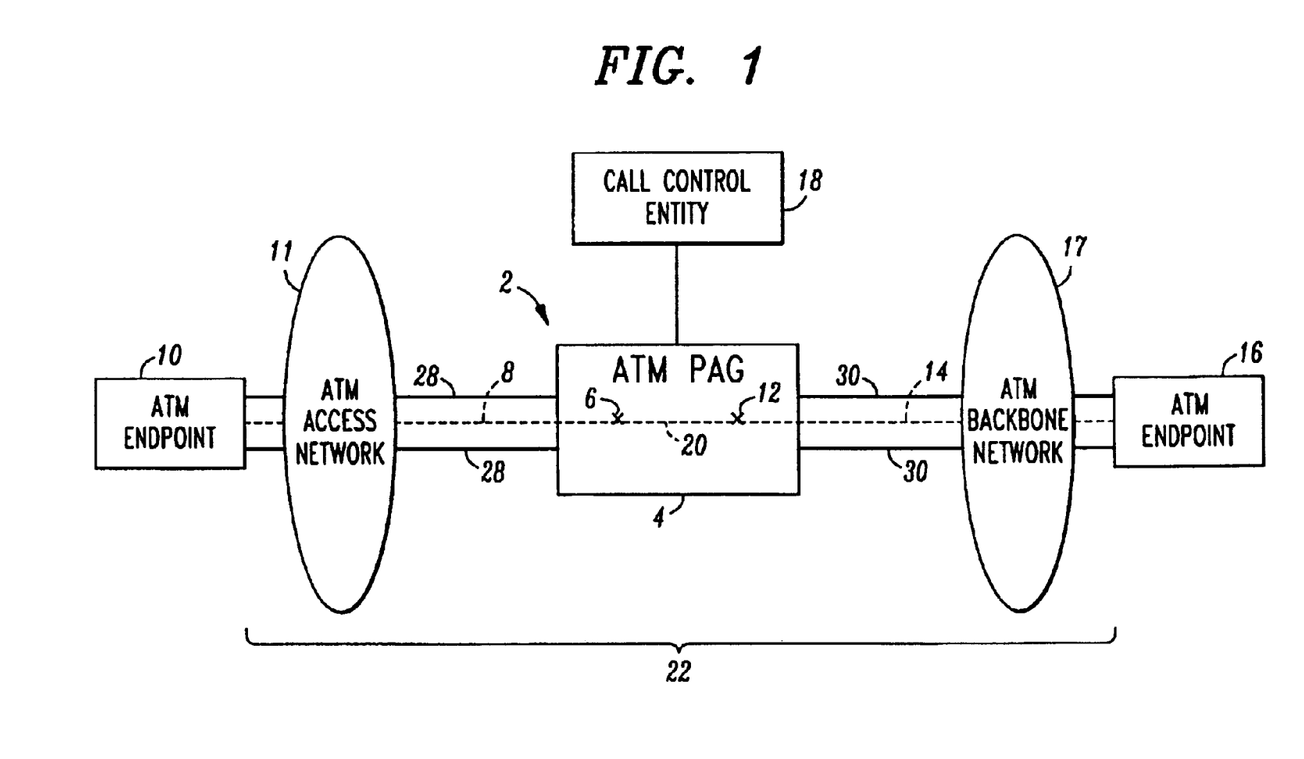
FIG. 1 is a block diagram showing an ATM Packet Access Gateway (ATM PAG) system constructed in accordance with the invention.

Turning now to the Drawing, wherein like reference numbers indicate like elements in all of the several views, FIG. 1 illustrates an ATM PAG system 2 for managing an ATM bearer path between communicating ATM endpoints. The system 2 includes an ATM PAG 4 having a first ATM connection termination 6 for terminating a first bearer connection 8 with a first ATM endpoint 10 via an ATM Access Network 11. The ATM PAG 4 further includes a second ATM connection termination 12 for terminating a second bearer connection 14 with a second ATM endpoint 16 via an ATM backbone network 17. A call control entity 18 is associated with the ATM PAG 4 and communicates call control instructions thereto. The call control instructions include instructions for logically concatenating (see reference numeral 20) the first and second bearer connections 8 and 14 into an active ATM bearer path 22 extending between the first ATM endpoint 10 and the second ATM endpoint 16.

Figure 2:
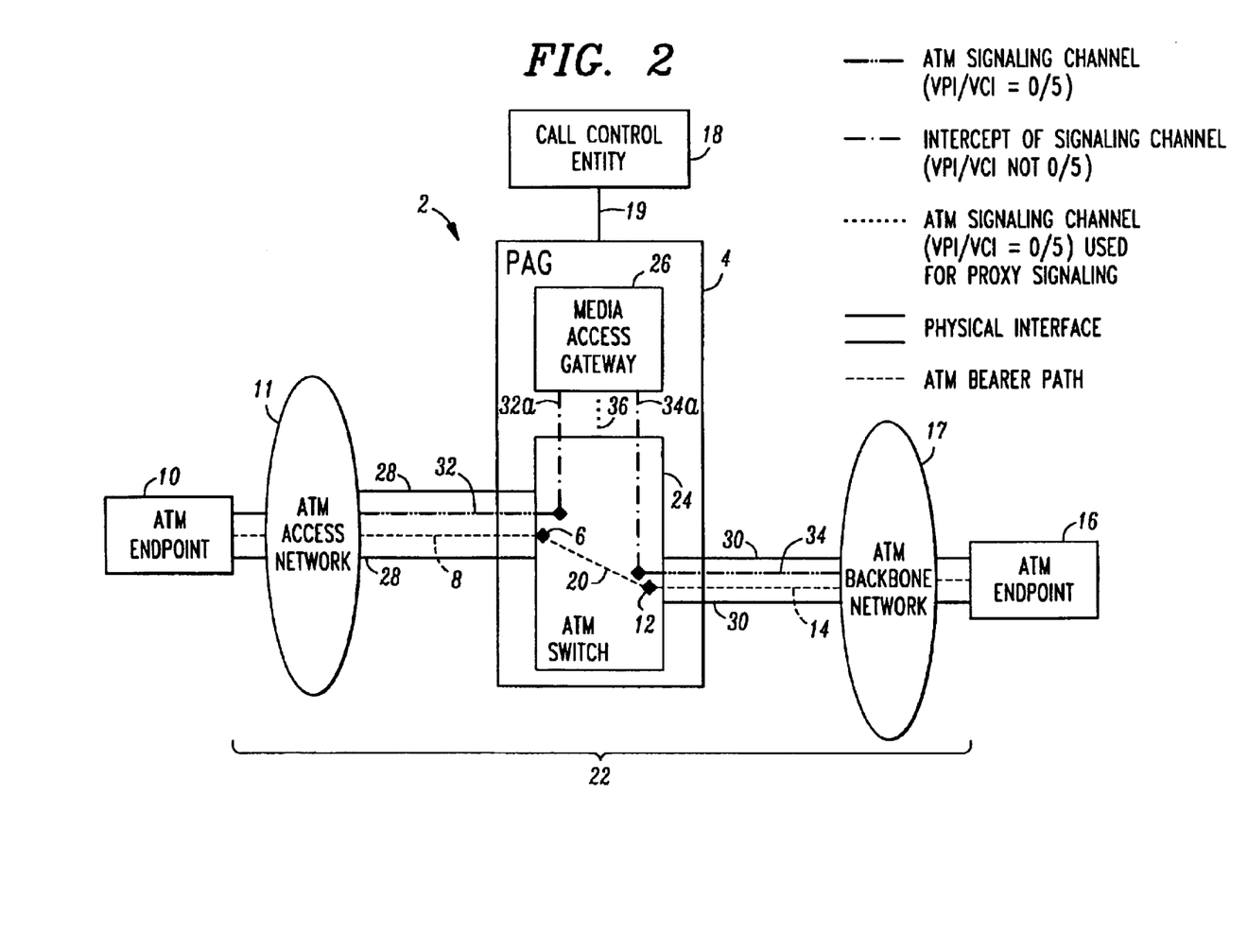
FIG. 2 is a block diagram showing a more detailed view of the ATM PAG of FIG. 1.

Turning now to FIG. 2, the ATM PAG 4 preferably includes an ATM switch 24 and a Media Access Gateway 26. The ATM switch 24 acts as an ATM bearer traffic packet handler that moves bearer traffic ATM packet payloads over the active ATM bearer path 22. The ATM bearer traffic carried over the first bearer connection 8 is transported via a physical interface 28 between the ATM Access Network 11 and the ATM Switch 24. The ATM bearer traffic carried over the second bearer connection 14 is transported via a physical interface 30 between the ATM Backbone Network 17 and the ATM Switch 24. Preferably, the ATM switch 24 is configured to carry at least CBR (Constant Bit Rate) traffic. The ATM switch 24 is preferably further configured to deliver UNI (User Network Interface) or NNI (Network to Network Interface) signaling traffic to and from the MAG 26. UNI/NNI signaling traffic is carried over a signaling channel 32 (via the interface 28) between the ATM Access Network 11 and the ATM Switch 24. UNI/NNI signaling traffic is carried over a signaling channel 34 (via the interface 30) between the ATM Backbone Network 17 and the ATM Switch 24. The ATM switch 24 is configured to deliver ATM cells on the signaling channel 32 to/from the Media Access Gateway 26 on a signaling channel 32a. The ATM switch 24 is configured to deliver ATM cells on the signaling channel 34 to/from the Media Access Gateway 26 on a signaling channel 34a. Thus the Media Access Gateway 26 controls the UNI/NNI signaling channel for the interfaces 28 and 30. FIG. 2 further shows a UNI signaling channel 36 between the ATM switch 24 and the MAG 26. The MAG 26 uses proxy signaling on the UNI signaling channel 36 to control the establishment of connection 20 in the ATM switch 24.

The MAG 26 thus has three signaling channels. The MAG 26 uses signaling channel 32a to send/receive UNI/NNI signaling messages to/from the ATM Access Network 11 in order to control ATM bearer connection establishment on the interface 28. The MAG 26 uses signaling channel 34a to send/receive UNI/NNI signaling messages to/from the ATM Backbone Network 17 in order to control ATM bearer connection establishment on the interface 30. The MAG 26 uses proxy signaling on the UNI signaling channel 36 to control the establishment of ATM bearer connections within the ATM switch 24, e.g. connection 20. Thus, the MAG 26 contains 3 signaling entities, one for each signaling channel. Each of these signaling entities will have a different address. The address designation "addr_mag_bb" will be used to signify the address known by the ATM backbone network 17 for the signaling channel 34. The address designation "addr_mag_acc" will be used to signify the address known by the ATM access network 11 for the signaling channel 32. The address designation "addr_mag_px" will be used to signify the address known by the ATM switch 24 for the signaling channel 36.

The ATM PAG 4 can be implemented as a nonintegrated system wherein the ATM switch 24 and the MAG 26 reside on separate computer platforms, and communicate using UNI proxy signaling (see below) or a suitable API (Application Programming Interface). The ATM PAG 4 may also be implemented as an integrated system wherein the ATM switch 24 and the MAG 26 reside on the same computer platform and communicate via an internal interface. This platform can include a conventional ATM hardware board (not shown) for implementing the ATM switch 24, such that all ATM bearer traffic is hardware switched. The functions of the MAG 26 can be implemented in software. Signaling packets may then be routed over a local bus from the ATM switch's hardware board to a local CPU for processing. The same (or different) bus may be used for passing call control messages between the CPU and the communication link 19.

The call control entity 18 can be implemented using a conventional CFS (Call Feature Server)/MGP (Media Gateway Proxy) with appropriate software modifications being made to implement the call control functions described herein. The call control entity 18 can communicate with the ATM PAG 4 using the IPDC (Internet Protocol Device Control) protocol, or any other suitable media gateway control protocol (e.g. H.248 (also known as the Media gateway control (Megaco) protocol)). The IPDC protocol is well known in the art, but extensions are required to support the ATM-PAG functions described herein. The call control entity 18 may be implemented on a separate computer platform froth the ATM PAG 4, or on the same platform.

Figure 3:
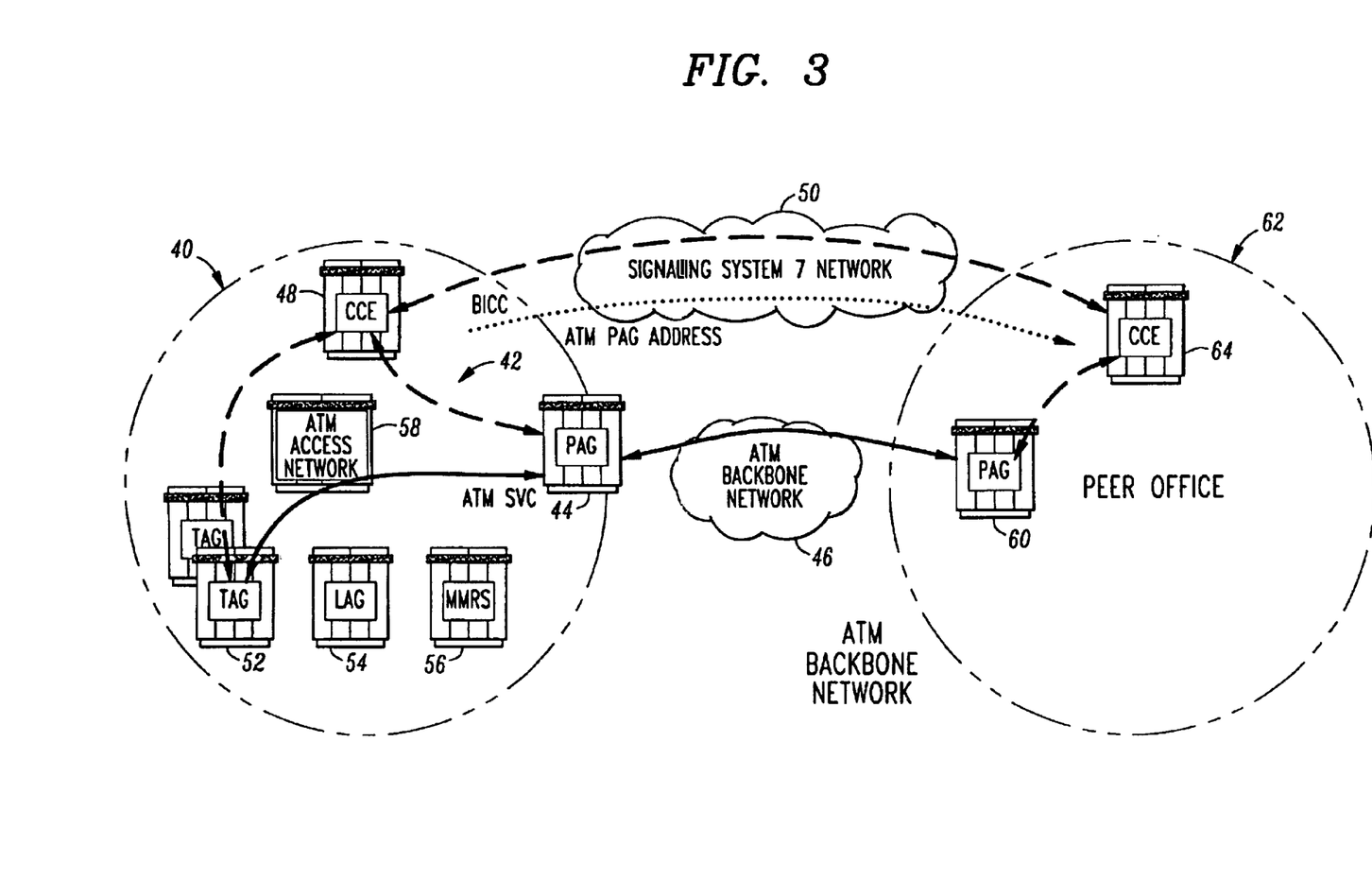
FIG. 3 is a block diagram showing an ATM PAG incorporated in an ATM switching node and handling an ATM bearer path during a first portion of a VoATM call.

Turning now to FIG. 3, an embodiment of the invention is shown for use in a network switching node 40. In this embodiment, an ATM PAG system 42 includes an ATM PAG 44 connected to an ATM backbone network 46, and a call control entity 48 connected to an SS7 (Signaling System 7) network 50 supporting BICC (Bearer Independent Call Control) messaging.

The switching node 40 further includes a Trunk Access Gateway (TAG) 52 that terminates one or more TDM trunks (not shown) and a Line Access Gateway (LAG) 54 that terminates one or more TDM lines (not shown). Both the trunk side of the TAG 52 and the line side of the LAG 54 handle TDM traffic. The TAG 52 and the LAG 54 also have an ATM side adapted to handle ATM traffic, and an internal interworking function for interworking between the TDM and ATM traffic. Note that the switching node 40 could be alternatively implemented as a tandem switch having multiple PAGs and no TAG or LAG.

A MultiMedia Resource Server (MMRS) is shown at 56. It provides multimedia content such as tones, announcements, and the like to communicating parties. Other devices, such as interworking gateways, interworking units, and data termination systems, could likewise be added to the switching node 40, depending on the services that are required. Like the TAG 52 and the LAG 54, the MMRS 56 has an ATM side that adapts the MMRS' stored multimedia content to the ATM AAL1 protocol.

An ATM access network 58 interconnects the ATM PAG 44, the TAG 52, the LAG 54 and the MMRS 56. The ATM access network 58 can be implemented using the GX™550 Core ATM switch product from Lucent Technologies, Inc., or any other suitable switching platform. The ATM access network 58 allows bearer connections to be established between any of the aforementioned entities that it interconnects. Such connections are setup under the control of the call control entity 48, which communicates not only with the ATM PAG 44, but also the TAG 52, the LAG 54 and the MMRS 56. As described above, the IPDC protocol can be used (but is not necessarily required) for control signaling sent by the call control entity 48 to the other entities of the switching node 40.

The ATM PAG 44, together with the call control entity 48, performs the ATM PAG functions described above relative to FIGS. 1–2. Namely, the ATM PAG 44 and the call control entity 48 implement per-call control of bearer paths between the TAG 52, the LAG 54, and other (remote or local) ATM endpoints. For example, as shown in FIG. 3, ATM bearer traffic may be carried on a bearer path that includes an intra-office connection between the TAG 52 or the LAG 54 and the ATM PAG 44. This connection extends through the ATM access network 58. The same bearer path also includes an inter-office connection between the ATM PAG 44 and a counterpart ATM PAG 60 located at a peer office 62. This connection extends through the ATM backbone network 46.

An exemplary call set-up sequence to establish the foregoing bearer path will now be described with continuing reference to FIG. 3. It will be assumed that an end user (not shown) has connected to the office 40 via a TDM interface with the TAG 52 or the LAG 54. It will be further assumed that the end user has requested the office 40 to set up a call to a party represented by the peer office 62. In response, the call control entity 48 sends a BICC message to the peer office 62. This message contains the ATM backbone network address of the ATM PAG 44. Note that the peer office 62 includes a counterpart call control entity 64 that receives the BICC message from the call control entity 48. The counterpart call control entity 64 instructs the counterpart ATM PAG 60 to send an ATM UNI/NNI SETUP message toward the ATM PAG 44 via the ATM backbone network 46. This results in an inter-office SVC (Switched Virtual Circuit) connection being established between the ATM PAG 44 and the counterpart ATM PAG 60. Note that as an alternative to the foregoing, the call control entity 48 could provide the address of the counterpart ATM PAG 60 to the ATM PAG 44 (if the address was provided to call control entity 48 in a BICC message from the call control entity 64) and request the latter to initiate the inter-office SVC connection.

Substantially simultaneously with the inter-office SVC connection being established, the call control entity 48 instructs the TAG 52 or the LAG 54, depending on which entity made the call request, to send an ATM UNI SETUP message with the ATM Access Network address of the ATM PAG 44 to the ATM Access Network 58. An intra-office SVC connection is negotiated and established in response to this request. Note that the call control entity 48 could also request the ATM PAG 44 to originate an ATM UNI SETUP message to the TAG 52 or the LAG 54. Once both of the foregoing SVC connections are established, the call control entity 48 instructs the ATM PAG 44 to through-connect the connections and establish an end-to-end bearer path between the TAG 52 or LAG 54, representing a first ATM endpoint, and the counterpart ATM PAG 60 in the peer office 62, representing a second ATM endpoint.

Figure 4:
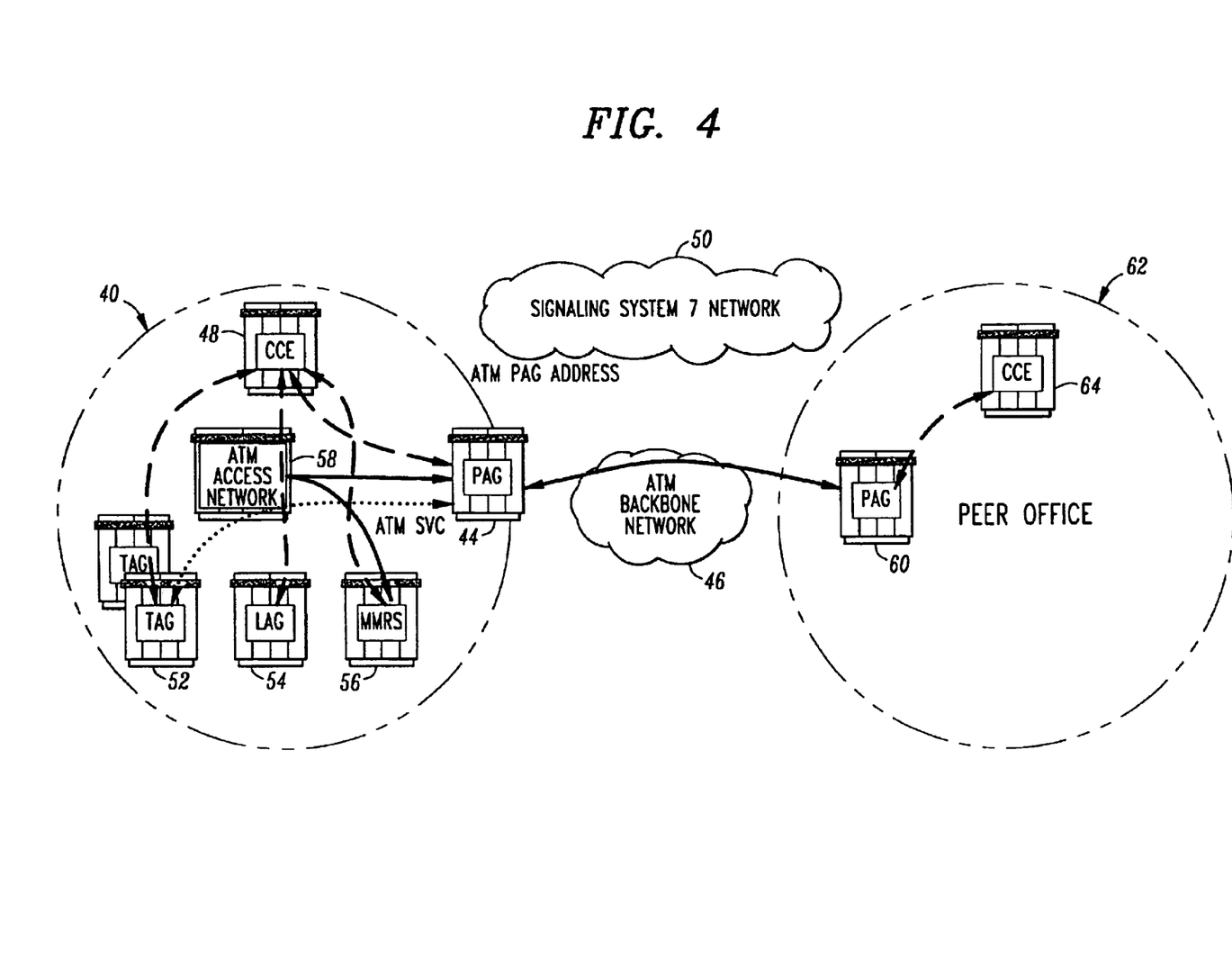
FIG. 4 is a block diagram showing the ATM PAG of FIG. 4 handling an ATM bearer path during a second portion of a VoATM call.

FIG. 4 illustrates an example of how the foregoing bearer path can be altered to connect the above-described counterpart ATM PAG 60 to the MMRS 56, such that announcements or tones can be played. To implement this change of bearer path, the call control entity 48 instructs the ATM PAG 44 to establish a new intra-office SVC connection to the MMRS 56. In response, the ATM PAG 44 sends an ATM UNI SETUP message with the address of MMRS 56. The call control entity 48 now instructs the ATM PAG 44 to through-connect the inter-office bearer connection between the ATM PAG 44 and the counterpart ATM PAG 60 in the peer office 62, and the second intra-office connection between the ATM PAG 44 and the MMRS 56, thus establishing a new end-to-end bearer path between the MMRS 56 and the counterpart ATM PAG 60. The call control entity 48 then instructs the TAG 52 or LAG 54 to tear down the intra-office SVC connection to the ATM PAG 44. In response, the TAG 52 or LAG 54 sends an ATM UNI RELEASE message towards the ATM PAG 44.

The above-described connection scenarios illustrate that the ATM PAG 44 can act as a bearer traffic pivot point that supports call redirection and the insertion/removal of service circuits in established connections. This means that features such as conferencing and transfer, call waiting, multiple call appearances, shared DN (Directory Number), and call pickup can all be supported for VoATM calls. More particularly, the ATM PAG 44 can be used to support functions such as (1) bearer-hold-and-alternate, (2) bearer-move, (3) bearer bridging, (4) dial tone, (5) stutter dial tone, (6) reorder tone, (7) call waiting tone, (8) digit collection/flash detection, (9) audible ringing toward a caller for incoming calls, and (10) comfort noise toward a caller when a bearer path is placed on hold. Wiretapping support is also provided due to the ability keep bearer connections routed through the fixed location of the ATM PAG 44.

Figure 5:
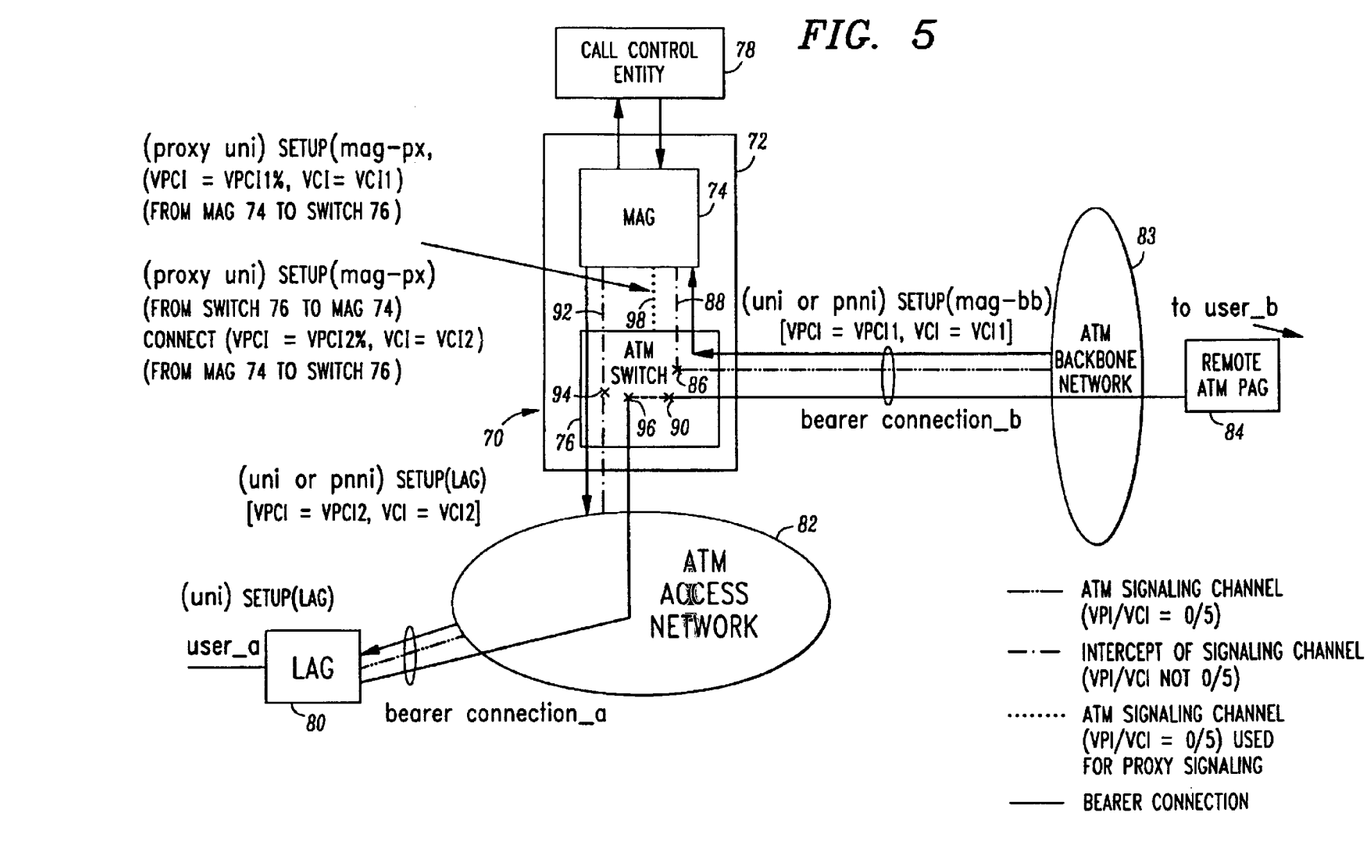
FIG. 5 is a block diagram showing ATM UNI signaling in an ATM PAG system constructed in accordance with the invention.
Figure 6A:
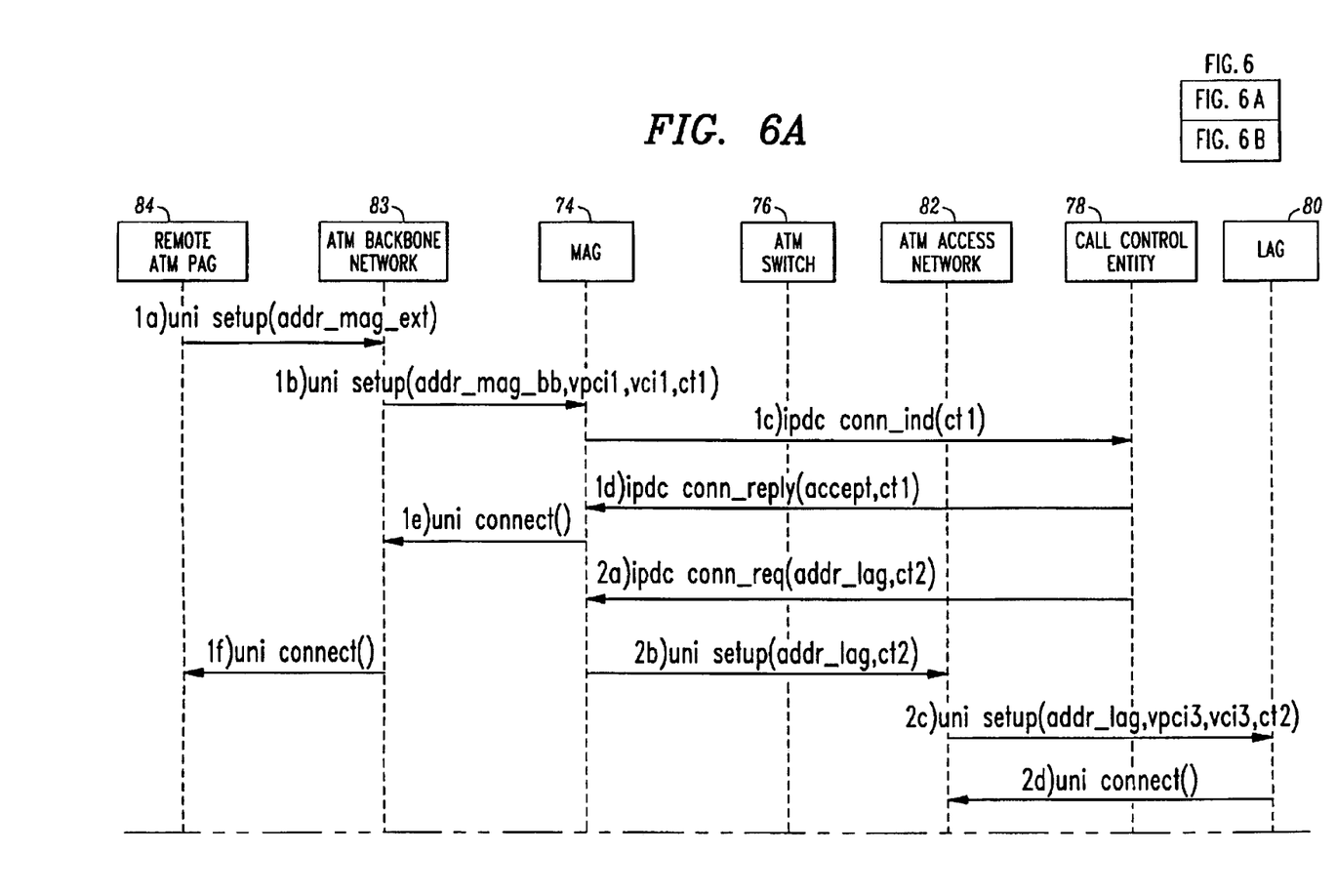
FIG. 6 is a flow diagram showing an exemplary call setup procedure performed in the ATM PAG system of FIG. 5.
Figure 6B:
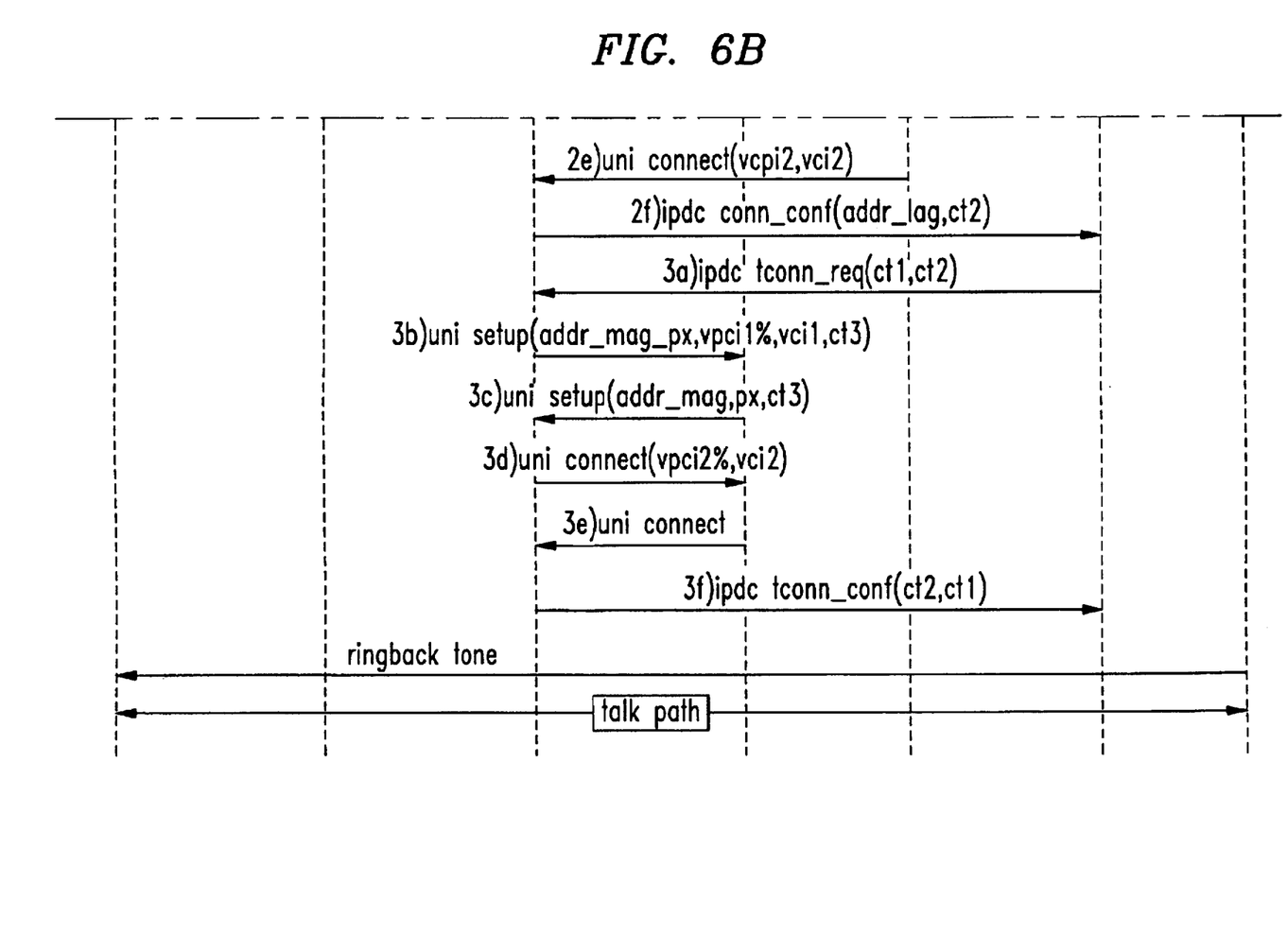

Turning now to FIGS. 5 and 6, an exemplary call set-up procedure will be described for a BICC call involving an ATM PAG in accordance with the invention. In FIG. 5, a switching node 70 in a VoATM communication system includes an ATM PAG 72 comprising a MAG 74 and an ATM switch 76. In addition, there is a call control entity 78 and a LAG 80 serving a caller who shall be designated as "user_a." An ATM access network 82 interconnects the LAG 80 and the ATM PAG 72. An ATM backbone network 83 allows a remote caller, who shall be designated as "user_b," to communicate with user_a through the switching node 70. User_b is assumed to be served by a remote ATM PAG 84 in a peer network.

FIG. 6 shows an exemplary message flow occurring during call setup for a call between user_b and user_a. The messages include UNI signaling messages exchanged between the switch 76 and the MAG 74, UNI or PNNI signaling messages exchanged between the ATM Access Network 82 and the MAG 74, and UNI or PNNI signaling messages exchanged between the ATM Backbone Network 83 and the MAG 74. In addition, there are IPDC messages exchanged between the MAG 74 and the call control entity 78. The flow diagram of FIG. 6 assumes that user_a has previously initiated a call to user_b, that the LAG 80 has passed the call request to the call control entity 78 (e.g., as an IPDC message) and that the call control entity has sent a message (e.g., a BICC message) to a call control entity serving the remote ATM PAG 84, requesting the latter to set up a connection to the ATM PAG 72.

It is at this point that step 1a of FIG. 6 is implemented. In this step, the remote ATM PAG 84 sends an ATM UNI SETUP message to the ATM Backbone Network 83. The message sent to the ATM Backbone Network 83 contains the destination address of the MAG 74 (addr_mag_bb) for that network and a correlation tag (ct1). In step 1b, the ATM Backbone Network 83 processes this message and forwards it to the ATM PAG 72, and specifically to the MAG 74. The message sent to the MAG 74 contains the destination address of the MAG 74 (addr_mag_bb), a virtual path connection identifier (vpci1), a virtual channel identifier (vci1), and a correlation tag (ct1). The message is sent on the usual ATM signaling channel (vpi/vci=0/5) to the ATM switch 76. There, it is intercepted at a signaling intercept point 86 and directed to the MAG 74 on a local (intra-pag) signaling channel 88 (vpi/vci≠0/5). Note that the correlation tag is a known ATM message parameter that allows the ATM bearer setup messages to be correlated with the BICC call control messages. In step 1c, the MAG 74 sends an IPDC message (ipdc conn_ind(ct1)) to the call control entity 78 to advise that an SVC connection request from the remote ATM PAG 84 has been received. In step 1d, the call control entity 78 sends an IPDC message (ipdc conn_reply(accept, ct1) to the MAG 74 instructing it to accept the requested SVC connection. In step 1e, the MAG 74 sends an ATM UNI CONNECT message to the ATM Backbone Network 83. This message is sent on the local (intra-pag) signaling channel 88 to the ATM switch and is placed on the normal ATM signaling channel (vpi/vci=0/5) at the signaling intercept point 86. In step 1f, the ATM Backbone Network 83 sends an ATM UNI CONNECT message to the remote ATM PAG 84, thereby establishing the SVC connection. Note that this connection is terminated at an ATM connection termination 90 in the ATM switch 76, and not at the MAG 74 itself.

In step 2a, the call control entity 78 initiates setup of the next SVC connection by sending an IPDC message (ipdc conn_req(addr_lag, ct2) to the MAG 74. This message instructs the MAG 74 to set up an SVC connection to the LAG 80 and to assign the connection a correlation tag (ct2). In step 2b, the MAG 74 sends an ATM UNI SETUP message to the ATM access network 82. This message contains the destination address of the LAG 80 (addr_lag) and the correlation tag (ct2) specified by the call control entity 78 in step 2a. It is sent on a local (intra-pag) signaling channel 92 (vpi/vci≠0/5) to a signaling intercept point 94 in the ATM switch 76. From there, the message is sent the ATM access network 82 on the normal ATM signaling channel (vpi/vci=0/5). In step 2c, the ATM access network 82 generates its own ATM UNI SETUP message and sends it to the LAG 80. This message includes the destination address of the LAG 80 (addr_lag), a virtual path connection identifier (vpci3) a virtual channel identifier (vci3), and the correlation tag (ct2). In step 2d, the LAG 80 responds to the UNI SETUP request of step 2c with a UNI CONNECT message. In step 2e, the ATM access network 82 sends a UNI CONNECT message which contains a virtual path connection identifier (vpci2), a virtual channel identifier (vci2) to the MAG 74, and the second SVC connection is established. Note that this connection is terminated at the ATM switch 76 at an ATM connection termination 96, and not at the MAG 74 itself. In step 2f, the MAG 74 sends an IPDC message (ipdc conn_conf(addr_lag, ct2) to the call control entity 78, advising that the second SVC connection has been set up.

In step 3a, the call control entity 78 sends an IPDC message (ipdc tconn_req (ct1,ct2)) which instructs the MAG 74 to concatenate the two connections within the ATM switch 76. This message instructs the MAG 74 to concatenate the two connections identified by ct1 and ct2. In step 3b, MAG 74 sends a UNI SETUP message to ATM switch 76 using proxy signaling. This message is sent on a local (intra-pag) proxy signaling channel (vpi/vci=0/5) 98. It contains the proxy destination address of the MAG 74 (addr_mag_px), the correlation tag (ct3—which is an internal identifier assigned by MAG 74), a virtual path connection identifier (vpci1%) and a virtual channel identifier (vci1). The Switch 76 is configured such that the VPCI value vpci1% identifies the interface and VPI value identified by vpci1 in step 1b. In step 3c, the ATM switch 76 generates its own ATM UNI SETUP message and sends it to the MAG 74 over the proxy signaling channel 98. This message includes the proxy destination address of the MAG 74 (addr_mag_px) and the correlation tag (ct3). Based on the identifier ct3, the MAG 74 knows this message was a result of the message it sent in step 3b. In step 3d, the MAG 74 responds to the UNI SETUP request of step 3c with a UNI CONNECT message. This message contains a virtual path connection identifier (vpci2%) and a virtual channel identifier (vci2). The ATM switch 76 is configured such that the VPCI value vpci2% identifies the interface and VPI value identified by vpci2 in step 2e. The connections are now through-connected between the ATM termination points 90 and 94. In step 3f, the MAG 74 sends an IPDC message (ipdc tconn_conf(ct1,ct2) to the call control entity 78, advising that the two SVC connections have been concatenated. The LAG 80 generates a ringback tone to the remote ATM PAG 84, and the ATM bearer path is ready for use.

Accordingly, an ATM Packet Access Gateway (ATM PAG) system has been disclosed for managing an ATM bearer path between ATM endpoints. Advantageously, by serving as a point of connection mediation, the disclosed ATM PAG system provides per-call control of ATM bearer paths independently of the actions of the communicating endpoints. When implemented in a VoATM communication network, the ATM PAG system of the invention provides feature independence by allowing each switching node to implement calling features independently of features being implemented at other switching nodes. Without the ATM PAG system, activation of call feature requests from ATM endpoints would require cooperation between the switching nodes involved in a call. Because each switching node operates independently of the other, there would be a possibility of simultaneous and conflicting feature requests being implemented. The ATM PAG system of the invention eliminates the possibility of such conflicts as well as the need for negotiation when activating feature requests. Support for communications assistance for law enforcement is also provided by virtue of the fact that a bearer path can be held within a geographic boundary in which it may be surveilled. By comparison, in VoATM calls handled by traditional routers, there is no such guarantee of geographic control.

While various embodiments of the invention have been described, it should be apparent that many variations and alternative embodiments could be implemented in accordance with the invention. As briefly mentioned above, for example, instead of using UNI proxy signaling between a nonintegrated MAG and ATM switch comprising an ATM PAG, a specialized API could be developed to handle the concatenation of bearer connections. It will also be appreciated that the call control entity disclosed herein could be a distributed system, with one call control entity component controlling the ATM PAG and another controlling a TAG or a LAG. In addition, as also mentioned above, the MAG can be integrated into an ATM switch, which would make the interface between the ATM switch function and the ATM MAG function an internal interface. In addition to Voice over ATM calls, there could be data and video over ATM calls and the invention would also apply to these calls. It is understood, therefore, that the invention is not to be in any way limited except in accordance with the spirit of the appended claims and their equivalents.

What is claimed is:

1. An ATM Packet Access Gateway (ATM PAG) system for managing an ATM bearer path between ATM endpoints, comprising:
   an ATM PAG;
   a first ATM bearer connection termination in said ATM PAG for terminating a first bearer connection with a first ATM endpoint;
   a first address associated with said ATM PAG for said first ATM bearer connection, a second ATM connection termination in said ATM PAG for terminating a second bearer connection with a second ATM endpoint;

a second address associated with said ATM PAG for said second ATM bearer connection;

a call control entity associated with said ATM PAG for communicating call control instructions to said ATM PAG, said call control instructions including instructions for logically concatenatiug said connections into an active ATM bearer path extending between said first ATM endpoint and said second ATM endpoint;

a Media Access Gateway (MAG) in said ATM PAG for controlling the establishment of said first and second bearer connections;

an ATM switch in said ATM PAG for establishing said first and second bearer connections and moving bearer traffic ATM packet payloads over said active ATM bearer path; and said MAG and said ATM switch being adapted to cooperate in the logical concatenation of said first and second bearer connections and the formation of said active ATM bearer path.

2. A system in accordance with claim 1 wherein said MAG and said ATM switch are co-located on a common integrated computer hardware platform and communicate via an internal interface to logically concatenate said connections.

3. A system in accordance with claim 1 wherein said MAG and said ATM switch are located on separate computer hardware platforms and communicate via an external interface to logically concatenate said connections.

4. A system in accordance with claim 3 wherein said external interface comprises UNI proxy signaling.

5. A system in accordance with claim 3 wherein said external interface comprises an application programming interface.

6. A system in accordance with claim 1 wherein said ATM switch is adapted to move bearer traffic ATM packet payloads between said first ATM endpoint to said second ATM endpoint by:

receiving a bearer traffic ATM packet over said first or second bearer connections;

determining from the packet header of said bearer traffic ATM packet that said packet should be directed to said first or second ATM endpoints; and forwarding said bearer traffic ATM packet to said first or second ATM endpoints over said first or second bearer connections.

7. A system in accordance with claim 1 wherein said system includes an ATM Line Access Gateway (LAG) terminating plural TDM lines, an ATM Trunk Access Gateway (TAG) terminating plural TDM trunks, and an ATM Access Network interconnecting said ATM PAG, said LAG and said TAG.

8. A system in accordance with claim 3 wherein said system further includes one or more resource servers, interworking gateways, interworking units, or data termination systems.

9. A system in accordance with claim 1 wherein said system includes more than one ATM PAG and an ATM Access Network interconnecting said ATM PAGs.

10. A system in accordance with claim 1 wherein ATM signaling messages to/from said PAG are intercepted by said ATM switch and forwarded to/from said MAG.

11. A method for managing an ATM bearer path between ATM endpoints, comprising the steps of:

terminating a first ATM bearer connection with a first ATM endpoint;

said termination of said first ATM bearer connection being associated with a first address;

terminating a second ATM bearer connection with a second ATM endpoint;

said termination of said second ATM bearer connection being associated with a second address;

logically concatenating said first and second bearer connections into an active ATM bearer path extending between said first ATM endpoint and said second ATM endpoint; and moving bearer traffic ATM packet payloads over said active ATM bearer path.

12. A method in accordance with claim 11 wherein said moving step includes moving bearer traffic ATM packet payloads between said first ATM endpoint and said second ATM endpoint by:

receiving a bearer traffic ATM packet over said first or second bearer connections;

determining from the packet header of said bearer traffic ATM packet that said packet should be directed to said first or second ATM endpoints; and forwarding said bearer traffic ATM packet to said first or second ATM endpoints over said first or second bearer connections.

13. A method in accordance with claim 11 including terminating plural TDM lines at a Line Access Gateway (LAG), terminating plural TDM trunks at a Trunk Access Gateway (TAG), and interconnecting said ATM PAG, said LAG and said TAG via an ATM Access Network.

14. A method in accordance with claim 13 further including providing a common call control entity for said ATM PAG, said LAG and said TAG.

15. A method in accordance with claim 12 further including connecting one or more of ATM PAG, said LAG and said TAG to one or more resource servers, interworking gateways, interworking units or data termination systems.

16. A method in accordance with claim 12 further including connecting more than one ATM PAG via a shared ATM Access Network.

17. A method in accordance with claim 11 wherein said concatenation step includes using proxy signaling.

18. A method in accordance with claim 11 wherein said concatenation step includes using an application programming interface.

19. A method in accordance with claim 11 wherein said concatenation step includes using an internal interface.

20. A method in accordance with claim 11 further including intercepting signaling messages to and from said ATM endpoints.

21. A computer program product for managing an ATM bearer path between ATM endpoints, comprising:

one or more data storage media;

program means recorded on said one or more data storage media for;

terminating a first ATM bearer connection with a first ATM endpoint;

said termination of said first ATM bearer connection being associated with a first address;

terminating a second ATM bearer connection with a second ATM endpoint;

said termination of said first ATM beater connection being associated with a first address;

logically concatenating said first and second bearer connections into an active ATM bearer path extending between said first ATM endpoint and said second ATM endpoint; and moving bearer traffic ATM packet payloads over said active ATM bearer path.

22. A program product in accordance with claim 21 wherein said program means includes means for moving bearer traffic ATM packet payloads between said first ATM endpoint and said second ATM endpoint by:
   receiving a bearer traffic ATM packet over said first or second bearer connections;
   determining from the packet header of said bearer traffic ATM packet that said packet should be directed to said first or second ATM endpoints; and
   forwarding said bearer traffic ATM packet to said first or second ATM endpoints over said first or second bearer connections.

23. A program product in accordance with claim 21 further including program means for terminating plural TDM lines at a Line Access Gateway (LAG), terminating plural TDM trunks at a Trunk Access Gateway (TAG), and interconnecting said ATM PAG, said LAG and said TAG via an ATM Access Network.

24. A program product in accordance with claim 23 further including program means for allowing a call control entity to serve as a call control entity for said ATM PAG, said LAG and said TAG.

25. A program product in accordance with claim 21 further including program means for connecting one or more of ATM PAG, said LAG and said TAG to one or more resource servers, interworking gateways, interworking units, or data termination systems.

26. A program product in accordance with claim 21 further including program means for connecting more than one ATM PAG via a shared ATM Access Network.

27. A program product in accordance with claim 21 wherein said concatenation means uses proxy signaling.

28. A program product in accordance with claim 21 wherein said concatenation means includes an application programming interface.

29. A program product in accordance with claim 21 wherein said concatenation means includes an internal interface.

30. A program product in accordance with claim 21 further including program means for intercepting signaling messages to and from said ATM endpoints.

31. An ATM Packet Access Gateway (ATM PAG) for managing an ATM bearer path between ATM endpoints, comprising:
   a first ATM bearer connection termination for terminating a first bearer connection with a first ATM endpoint;
   a first address associated with said ATM PAG for said first ATM bearer connection;
   a second ATM connection termination for terminating a second bearer connection with a second ATM endpoint;
   a second address associated with said ATM PAG for said second ATM bearer connection;
   a Media Access Gateway (MAG) for controlling the establishment of said first and second bearer connections;
   an ATM switch for moving bearer traffic ATM packet payloads over said active ATM bearer path; and
   said MAG and said ATM switch being adapted to cooperate in the logical concatenation of said first and second bearer connections and the formation of said active ATM bearer path based on call control instructions received by said MAG from a call control entity.

* * * * *